(12) United States Patent
Abe

(10) Patent No.: US 7,455,794 B2
(45) Date of Patent: Nov. 25, 2008

(54) ELECTRICALLY CONDUCTIVE POLYANILINE COMPOSITION, FILM THEREOF AND METHOD OF PRODUCING THEM

(75) Inventor: Masao Abe, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 12/071,792

(22) Filed: Feb. 26, 2008

(65) Prior Publication Data

US 2008/0157026 A1    Jul. 3, 2008

Related U.S. Application Data

(62) Division of application No. 10/499,064, filed as application No. PCT/JP02/06450 on Jun. 26, 2002.

(30) Foreign Application Priority Data

Dec. 19, 2001   (JP) .............................. 2001-386752

(51) Int. Cl.
*H01B 1/12* (2006.01)
*C08G 73/00* (2006.01)

(52) U.S. Cl. ...................................................... 252/500
(58) Field of Classification Search ................. 252/500; 525/504, 505; 560/10, 14
See application file for complete search history.

(56) References Cited

U.S. PATENT DOCUMENTS 2,837,589 A    6/1958  Konig

| | | |
|---|---|---|
| 5,264,552 A | 11/1993 | Abe et al. |
| 6,814,888 B2 * | 11/2004 | Kuwahara .................... 252/500 |
| 2003/0113611 A1 | 6/2003 | Abe et al. |

FOREIGN PATENT DOCUMENTS

| | | |
|---|---|---|
| JP | 61258831 | 11/1986 |
| JP | 63027526 | 2/1988 |
| JP | 03-028229 | 2/1991 |
| JP | 3035516 | 2/1991 |
| JP | 03-052929 | 3/1991 |
| JP | 10-036687 | 2/1998 |
| JP | 10036667 | 2/1998 |
| WO | 92-22911 | 12/1992 |
| WO | 2001-143215 | 6/2001 |
| WO | WO 03/051961 | * 6/2003 |

* cited by examiner

*Primary Examiner*—Mark Kopec
(74) *Attorney, Agent, or Firm*—Wenderoth, Lind & Ponack, L.L.P.

(57) ABSTRACT

The invention provides an electrically conductive polyaniline composition comprising polyaniline which contains at least one of novolac resins selected from the group consisting of phenolsulfonic acid novolac resin and naphtholsulfonic acid novolac resin as a dopant. The electrically conductive polyaniline composition is obtained by contacting polyaniline with an aqueous solution of the novolac resin to dope the polyaniline with the novolac resin.

The invention further provides an electrically conductive polyaniline film which comprises the polyaniline containing the novolac resin as a dopant. The electrically conductive polyaniline film is obtained by contacting film of polyaniline with an aqueous solution of the novolac resin to dope the polyaniline.

7 Claims, 2 Drawing Sheets

ELECTRICALLY CONDUCTIVE POLYANILINE COMPOSITION, FILM THEREOF AND METHOD OF PRODUCING THEM

This is a Ser. No. 10/499,064, filed Jun. 17, 2004, which is a 371 of PCT/JP02/06450 filed Jun. 26, 2002.

TECHNICAL FIELD

The present invention relates to an electrically conductive polyaniline composition superior in water resistance, a film thereof and a method of producing them.

BACKGROUND ART

In recent years, electrically conductive polyaniline compositions comprising polyaniline and dopant have been notable and used in various fields. For example, it is described in Japanese Unexamined Patent Publication No. 3-35516 that a film comprising the above-mentioned electrically conductive polyaniline composition is used as a solid electrolyte film in an aluminum electrolytic capacitor or a tantalum electrolytic capacitor. That is to say, it is described that an electrolytic capacitor superior in frequency characteristics can be obtained by applying a polyaniline solution on dielectric film to form a polyaniline film and then by doping the polyaniline film with a protonic acid. In addition, electrically the conductive polyaniline composition has been studied for practical use in a multitude of fields such as antistatic materials, electromagnetic shielding materials, magnetic recording media, film capacitors and batteries.

It has been also found out that the polyaniline has an eminently high heat resistance by properly selecting dopants. For example, it is described in Japanese Unexamined Patent Publication No. 10-36667 that an electrically conductive polyaniline composition containing an aliphatic monosulfonic acid having a carboxyl group as a dopant exhibits a very high heat resistance and that the decrease of electric conductivity is within one tenth of the initial value even after standing at a temperature of 125° C. for 650 hours.

It has, however, been conventionally pointed out that an electrically conductive polyaniline composition is not necessarily sufficient in water resistance which is important in practical use together with heat resistance. It has been then proposed that a polymer sulfonic acid is used as a dopant. It has been indeed already known as described in Japanese Unexamined Patent Publication No. 3-28229 that an electrically conductive polyaniline composition is provided with improved water resistance by using a polymer sulfonic acid as a dopant compared with the case of using a low-molecular weight sulfonic acid as a dopant.

When a polymer sulfonic acid such as polyvinylsulfonic acid is used as a dopant, it is true that a polyaniline composition obtained is improved in water resistance as compared with the case of using a low-molecular weight sulfonic acid compound; however, after the polyaniline composition is immersed in water for a long period, the decrease of electric conductivity of the composition is inevitable to a certain degree. The degree of the decrease of electric conductivity is approximately 1/400 of the initial value after being immersed in water for 500 hours.

DISCLOSURE OF THE INVENTION

The present invention has been completed to solve the problems mentioned above in electrically conductive polyaniline compositions. Accordingly, it is an object of the invention to provide an electrically conductive polyaniline composition superior in water resistance and heat resistance, a film thereof and a method of producing them.

The invention provides an electrically conductive polyaniline composition comprising polyaniline doped with at least one novolac resin selected from the group consisting of phenolsulfonic acid novolac resins and naphtholsulfonic acid novolac resins.

Such an electrically conductive polyaniline composition can be obtained by contacting polyaniline with an aqueous solution of the above-mentioned novolac resin to dope the polyaniline with the above-mentioned novolac resin, in accordance with the present invention.

Also, the invention provides a film comprising an electrically conductive polyaniline in which polyaniline is doped with the above-mentioned novolac resin. Such a film comprising electrically conductive polyaniline can be obtained by contacting a polyaniline film with an aqueous solution of the novolac resin to dope the polyaniline with the novolac resin in accordance with the invention.

Further, according to the invention, an electrically conductive polyaniline composition comprising polyaniline doped with the novolac resin is obtained by performing chemical oxidation polymerization or electrolytic oxidation polymerization of aniline in an aqueous solution in which the above-mentioned novolac resin and aniline are dissolved.

BEST MODE FOR CARRYING OUT THE INVENTION

Figure 1:
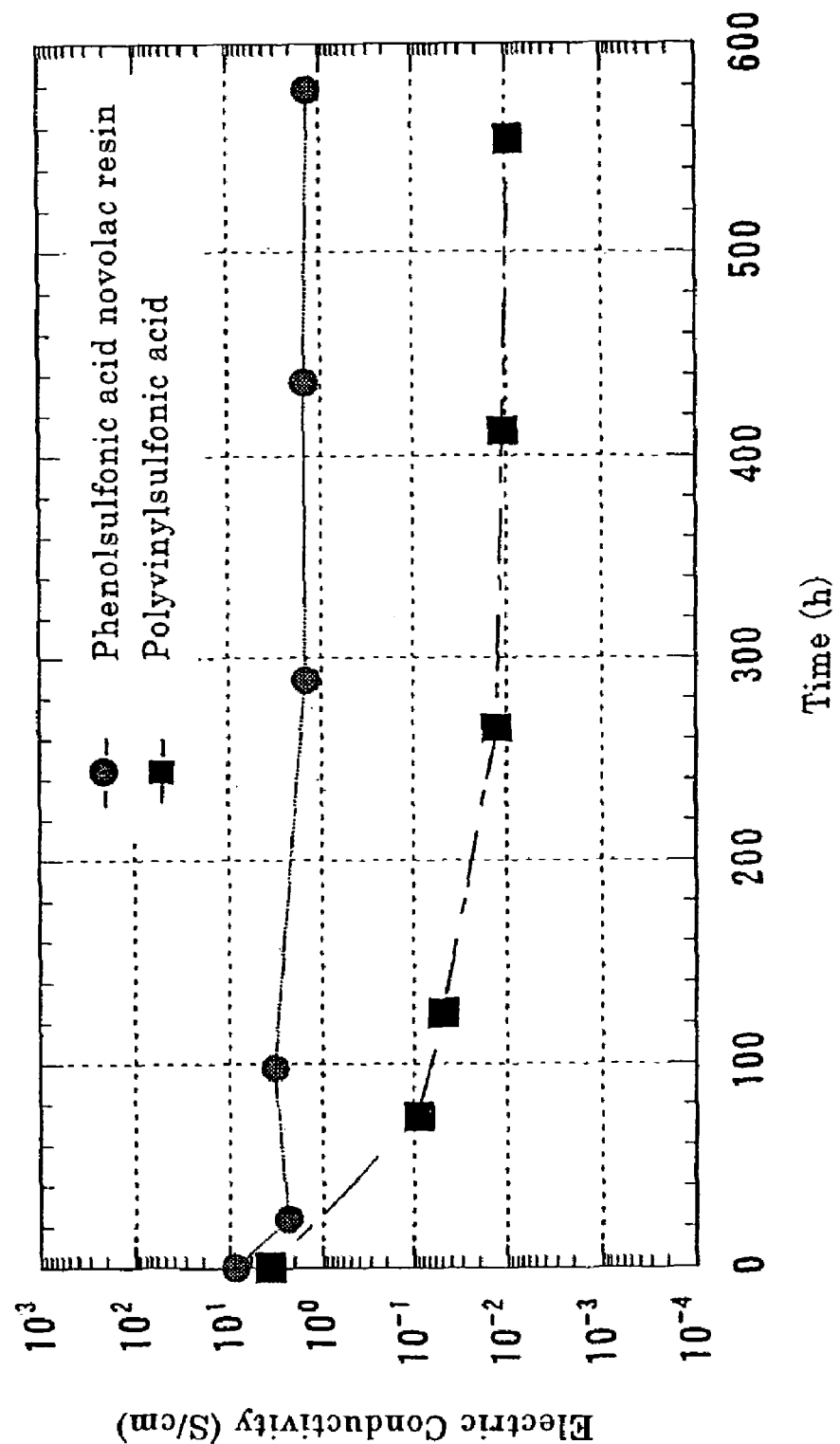
FIG. 1 is a graph showing the variations with time of electric conductivity of a film of electrically conductive polyaniline comprising polyaniline doped with p-phenolsulfonic acid novolac resin in accordance with the invention when it is immersed in distilled water while being compared with that of a film of electrically conductive polyaniline comprising polyaniline doped with polyvinylsulfonic acid.

An electrically conductive polyaniline composition according to the invention comprises polyaniline doped with at least one novolac resin selected from the group consisting of phenolsulfonic acid novolac resins and naphtholsulfonic acid novolac resins.

According to the invention, the polyaniline preferably comprises a repeating unit represented by the general formula (I)

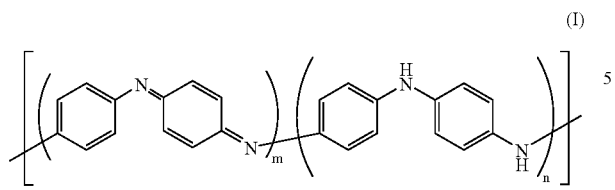 (I)

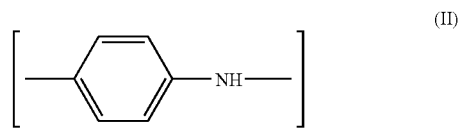 (II)

wherein m and n denote molar fractions of a quinonediimine structural unit and a phenylenediamine structural unit in the repeating unit, respectively, and satisfy the conditions: $0 \leq m \leq 1$, $0 \leq n \leq 1$ and $m+n=1$. The polyaniline is soluble in organic solvents when it is undoped. According to the invention, the polyaniline has an intrinsic viscosity [η] preferably of 0.40 dL/g or more, particularly preferably of 1.0 dL/g or more, measured at a temperature of 30° C. in N-methyl-2-pyrrolidone. Such polyaniline is hereinafter referred to as "the oxidized and dedoped polyaniline".

The oxidized and dedoped polyaniline as mentioned above has been already known as described in Japanese Unexamined Patent Publication No. 3-28229, and can be obtained by first producing an electrically conductive polyaniline composition doped with a protonic acid and then dedope the composition.

More specifically, aniline is reacted with an oxidizing agent such as ammonium peroxodisulfate in the presence of a protonic acid such as sulfuric acid in a solvent such as water or methanol, and then the deposited powder is collected by filtration, thereby providing an electrically conductive polyaniline composition doped with the protonic acid. Then, the powder is added to an aqueous solution of an alkaline substance such as ammonia to neutralize (namely, dedope) the electrically conductive polyaniline composition, thereby providing powder of oxidized and dedoped polyaniline soluble in organic solvents represented by the above-mentioned general formula (I).

The oxidized and dedoped polyaniline thus obtained has a high molecular weight and is soluble in various organic solvents. More specifically, the polyaniline has an intrinsic viscosity [η] usually of 0.40 dL/g or more measured at a temperature of 30° C. in N-methyl-2-pyrrolidone, and it is soluble in organic solvents such as N-methyl-2-pyrrolidone, N,N-dimethylacetamide, N,N-dimethyl-formamide, dimethyl sulfoxide, 1,3-dimethyl-2-imidazolidinone or sulfolane. The solubility of the oxidized and dedoped polyaniline in such organic solvents depends on the average molecular weight thereof and the solvents, but usually 0.5 to 100% of the polyaniline can be dissolved to provide a solution having a concentration of 1 to 30% by weight. In particular, the oxidized and dedoped polyaniline exhibits a high solubility in N-methyl-2-pyrrolidone, and 20 to 100% of the polyaniline can usually be dissolved to provide a solution of 3 to 30% by weight.

Also, the values of m and n of the oxidized and dedoped polyaniline can be adjusted by oxidizing or reducing the polyaniline. That is, the reduction thereof can decrease the value of m and increase the value of n, whereas the oxidation thereof can increase the value of m and decrease the value of n.

In particular, when the quinonediimine structure of the oxidized and dedoped polyaniline is totally reduced, polyaniline comprising an imino-p-phenylene structural unit represented by the following formula (II)

is obtained as described in Japanese Unexamined Patent Publication No. 3-52929. Such polyaniline is hereinafter referred to as "the reduced and dedoped polyaniline". The reduced and dedoped polyaniline is soluble in further diverse organic solvents as compared with the oxidized and dedoped polyaniline. The reduced and dedoped polyaniline is more highly soluble in solvents such as dimethylformamide, dimethylacetamide or dimethyl sulfoxide as compared with the oxidized and dedoped polyaniline.

When the oxidized and dedoped polyaniline is reduced, the molecular chain of the polyaniline is not substantially severed, so that the reduced and dedoped polyaniline obtained substantially retains the initial molecular weight of the oxidized and dedoped polyaniline. Accordingly, the reduced and dedoped polyaniline comprising an imino-p-phenylene structural unit represented by the formula (II) also has an intrinsic viscosity [η] usually of 0.40 dL/g or more, preferably 1.0 dL/g or more, measured at a temperature of 30° C. in N-methyl-2-pyrrolidone.

Reducing agents usable for reducing the oxidized and dedoped polyaniline include hydrazine compounds such as phenylhydrazine, hydrazine, hydrazine hydrate, hydrazine sulfate or hydrazine hydrochloride; and hydrogenated reductive metallic compounds such as lithium aluminum hydride or lithium borohydride. Among the exemplified above, hydrazine hydrate or phenylhydrazine is particularly preferred as a reducing agent for the reason that no residue is generated after the reduction reaction.

In order to reduce the oxidized and dedoped polyaniline using a reducing agent mentioned as above, ant common methods of reduction reaction may be employed, and they are not particularly limited. Accordingly, there may be mentioned, for example, a method in which the oxidized and dedoped polyaniline is dissolved in an organic solvent such as N-methyl-2-pyrrolidone, and then the reducing agent is added to the solution; a method in which the reducing agent is dissolving in organic solvents such as N-methyl-2-pyrrolidone, dimethylformamide or dimethylacetamide, and then the polyaniline is added to the solution; or a method in which the polyaniline is dispersed in a non-solvent, and then the reduction reaction is performed in a nonuniform system.

The reduction reaction is performed in a solution containing the oxidized and dedoped polyaniline in an amount usually of 0.1 to 15% by weight, preferably 0.5 to 10% by weight. It is preferred that the reducing agent is usually used in an amount equivalent to the quantity of quinonediimine structures in the oxidized and dedoped polyaniline. However, the reducing agent may be used in an amount more than the equivalent in order to accelerate the progress of the reaction.

In the case of using excessive amount of reducing agent in this manner, however, when the reduced and dedoped polyaniline obtained is directly doped in a solution, an unpreferable side reaction is occasionally caused and the decrease of molecular weight by the breakage of polymer chain is caused during a long-term preservation of a solution of the reduced and dedoped polyaniline. Accordingly, in the case of using excessive amount of reducing agent, it is desirable that the reduced and dedoped polyaniline obtained is purified by a reprecipitation process and thereafter doped.

On the other hand, oxidizing agents usable for oxidizing oxidized and dedoped polyaniline are not particularly limited if capable of oxidizing a phenylenediamine structural unit. Accordingly, for example, a moderate oxidizing agent, silver oxide, is preferably used. However, potassium permanganate, potassium dichromate or the like can be also used if necessary.

An electrically conductive polyaniline composition of the invention comprises such a polyaniline either oxidized and dedoped or reduced and dedoped with at least one novolac resin selected from the group consisting of phenolsulfonic acid novolac resins and naphtholsulfonic acid novolac resins. Such an electrically conductive polyaniline composition of the invention is obtained by doping the polyaniline either oxidized and dedoped or reduced and dedoped with at least one novolac resin selected from the group consisting of phenolsulfonic acid novolac resins and naphtholsulfonic acid novolac resins.

An electrically conductive polyaniline composition doped with the above-mentioned novolac resin according to the invention is also obtained by dissolving aniline in an aqueous solution of the novolac resin, and then adding an oxidizing agent to the aqueous solution while stirred to perform chemical oxidation polymerization of the aniline, or by immersing platinum electrodes in the above-mentioned aqueous solution and then electrifying with a direct current to perform electrolytic oxidation polymerization of the aniline.

The phenolsulfonic acid novolac resin is preferably represented by the general formula (III)

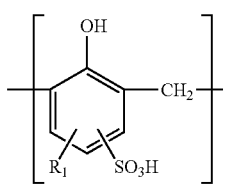

(III)

wherein $R_1$ denotes a hydrogen atom, an alkyl group, an alkoxyl group, a hydroxyl group, a carboxyl group or an amino group. The phenolsulfonic acid novolac resin is not particularly limited, however, p-phenolsulfonic acid novolac resin in which $R_1$ is a hydrogen atom and the substitution position of a sulfonic group is p-position with respect to a hydroxyl group is preferably used among the various phenolsulfonic acid novolac resins represented by the general formula (III).

The naphtholsulfonic acid novolac resin is preferably represented by the general formula (IV)

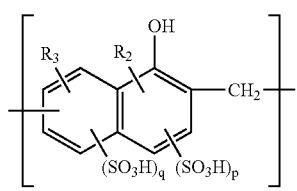

(IV)

wherein $R_2$ and $R_3$ denote each independently a hydrogen atom, an alkyl group, an alkoxyl group, a hydroxyl group, a carboxyl group or an amino group, and p and q are each independently an integer of 0, 1 or 2, provided that p and q are not simultaneously 0. The naphtholsulfonic acid novolac resin is not particularly limited; however, novolac resin of 1-naphtholsulfonic acid such as 1-naphthol-4-sulfonic acid, 1-naphthol-5-sulfonic acid or 1-naphthol-8-sulfonic acid, and 1-naphthol disulfonic acid such as 1-naphthol-3,6-disulfonic acid or 1-naphthol-3,8-disulfonic acid is preferably used among the naphtholsulfonic acid novolac resins represented by the general formula (IV).

These phenolsulfonic acid novolac resins and naphtholsulfonic acid novolac resins are not particularly limited with regard to their molecular weight; however, it is preferred that they have a weight-average molecular weight in the range of 2000 to 800000 measured by GPC while using polystyrene sodium sulfonate as a standard polymer. When the molecular weight of phenolsulfonic acid novolac resin or naphtholsulfonic acid novolac resin is less than 2000, the obtained electrically conductive polyaniline composition is not sufficiently improved in water resistance. Meanwhile, when the molecular weight of phenolsulfonic acid novolac resin or naphtholsulfonic acid novolac resin is more than 800000, an aqueous solution of phenolsulfonic acid novolac resin or naphtholsulfonic acid novolac resin used for doping is too high in viscosity to dope polyaniline easily as described later.

First, the production of electrically conductive polyaniline by doping the oxidized and dedoped polyaniline with phenolsulfonic acid novolac resin or naphtholsulfonic acid novolac resin is described.

According to the invention, the oxidized and dedoped polyaniline is contacted with the novolac resin for doping the polyaniline with the novolac resin. For example, powder of the polyaniline is immersed in an aqueous solution of the novolac resin at room temperature or under heating if necessary. In this case, an aqueous solution may be used containing novolac resin such that the number of moles of sulfonic groups in the novolac resin is in large excess with respect to the number of moles of aniline units in the polyaniline. The doping of polyaniline with the novolac resin by contacting polyaniline with the novolac resin in this manner (in the absence of an oxidizing agent) is referred to as "protonic acid doping" in the present specification.

It is thought that the protonic acid doping of oxidized and dedoped polyaniline is caused as illustrated below for the reason that an imine nitrogen atom in polyaniline is protonated by protonic acid so as to produce an iminium salt. The canonical structure of the iminium salt has a semiquinone cationic radical structure, which is called a doped state allowing electrical conductivity to polyaniline.

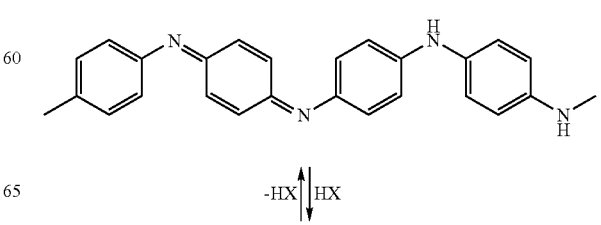

-continued

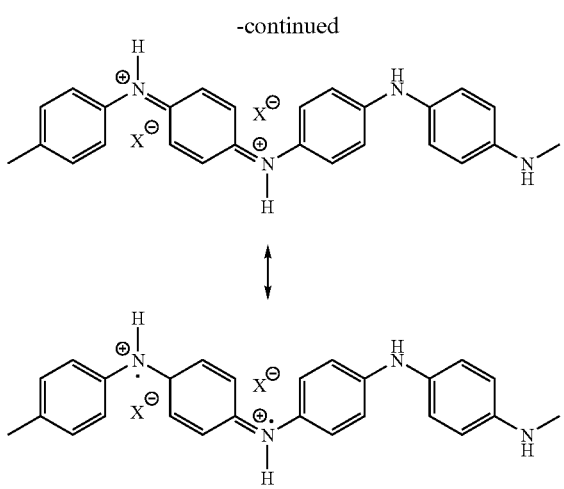

As described above, the oxidized and dedoped polyaniline used in the invention is soluble in organic solvents; therefore, it is preferred that the oxidized and dedoped polyaniline is dissolved in an organic solvent, cast on a base material, heated and dried, for example, at a temperature of 50 to 150° C. to provide a self-supporting film, and this film is contacted with an aqueous solution of the novolac resin to dope the polyaniline. A film comprising an electrically conductive polyaniline composition of the invention, namely, an electrically conductive polyaniline film can be obtained efficiently and easily in this manner.

For further details, an electrically conductive polyaniline film is obtained by immersing the self-supporting polyaniline film in an aqueous solution of the dopant or by applying the aqueous solution of the novolac resin on the film, and washing the film with an appropriate solvent if necessary.

The concentration of the aqueous solution of phenolsulfonic acid novolac resin or naphtholsulfonic acid novolac resin used for doping the polyaniline is not particularly limited, but it is usually in the range of 2 to 50% by weight. When the concentration of the aqueous solution of novolac resin is less than 2% by weight, a long time is required for doping. Meanwhile, when the concentration thereof is more than 50% by weight, an aqueous solution of novolac resin is too high in viscosity to dope polyaniline easily.

As described above, aniline is reacted with an oxidizing agent in the presence of protonic acid in a solvent and the deposited powder is collected by filtration to obtain an electrically conductive polyaniline composition doped with the protonic acid. Accordingly, aniline is reacted in a solvent with an oxidizing agent in the presence of either phenolsulfonic acid novolac resin or naphtholsulfonic acid novolac resin, and the deposited powder is collected by filtration to provide an electrically conductive polyaniline composition comprising polyaniline having the novolac resins as a dopant. Further, electrolytic oxidation polymerization of aniline is performed in the presence of phenolsulfonic acid novolac resin or naphtholsulfonic acid novolac resin in a solvent to provide an electrically conductive polyaniline composition in which polyaniline is doped with the novolac resins.

As oxidizing agents for chemical oxidation polymerization of aniline, those having a standard electrode potential of 0.6 V or more are preferably used, for example, as described in Japanese Patent No. 2649670. Such oxidizing agents include manganese dioxide, potassium permanganate, potassium dichromate, hydrogen peroxide or ferric chloride. Ammonium peroxodisulfate is also preferably used. These oxidizing agents are used in an amount of equivalent weight of 2 to 2.5 in relation to 1 mol of aniline. The equivalent is such an amount that is obtained by dividing 1 mol (molecular weight=M (g)) of the oxidizing agent by the number of electrons (n) required for reducing one molecule of the oxidizing agent. Namely, the equivalent is defined as M/n.

In chemical oxidation polymerization of aniline, solvents used are not particularly limited if they dissolve phenolsulfonic acid novolac resin or naphtholsulfonic acid novolac resin used together with aniline and additionally are inactive to the reaction; for example, water is particularly preferably used as described in Japanese Unexamined Patent Publication No. 3-28229. Also, lower aliphatic alcohols such as methanol or ethanol, nitriles such as acetonitrile, polar solvents such as N-methyl-2-pyrrolidone or dimethyl sulfoxide, or tetrahydrofuran are used. Further, mixed solvents of these organic solvents and water are used. On the other hand, phenolsulfonic acid novolac resin or naphtholsulfonic acid novolac resin as a protonic acid is usually used in large excess with respect to aniline.

Chemical oxidation polymerization of aniline is preferably performed at a temperature of 10° C. or less. In order to obtain high-molecular weight polyaniline, particularly, a reaction mixture is preferably retained at a temperature of 10° C. or less on the occasion of adding an oxidizing agent to an aniline solution containing phenolsulfonic acid novolac resin or naphtholsulfonic acid novolac resin.

An electrically conductive polyaniline composition comprising polyaniline doped with phenolsulfonic acid novolac resin or naphtholsulfonic acid novolac resin, namely, an electrically conductive polyaniline composition having the novolac resins as a dopant is precipitated as powder when such chemical oxidation polymerization of aniline is carried out. Thus, the powder is collected by filtration and dried whereby an electrically conductive polyaniline composition of the invention is obtained.

In the case of performing electrolytic oxidation polymerization of aniline, an electrically conductive polyaniline composition of the invention is obtained by immersing a pair of platinum electrodes in a solution as mentioned above that contains aniline as well as either phenolsulfonic acid novolac resin or naphtholsulfonic acid novolac resin in an amount equal or more to the aniline in terms of moles of the sulfonic groups of the resin, and then performing constant-potential polymerization through the application of an electric potential of 0.6 to 1.2 V with respect to the standard calomel electrodes connected by a salt bridge, or performing constant-current polymerization under the conditions of a current density of 0.1 to 50 mA/cm$^2$, or employing an electric potential scanning process of performing electrolytic polymerization through the scanning of an electric potential in a range of 0 to 0.8 V with respect to the standard calomel electrodes.

The production of electrically conductive polyaniline by doping the reduced and dedoped polyaniline with either phenolsulfonic acid novolac resin or naphtholsulfonic acid novolac resin is now described.

According to the invention, the reduced and dedoped polyaniline is preferably reacted with the novolac resin in the presence of an oxidizing agent in order to dope the polyaniline with the phenolsulfonic acid novolac resin or naphtholsulfonic acid novolac resin. Also, the reduced and dedoped polyaniline may be doped by reacting the polyaniline with the novolac resin while oxidizing with the use of electrodes for electrolysis instead of an oxidizing agent.

The doping of the polyaniline with the phenolsulfonic acid novolac resin or the naphtholsulfonic acid novolac resin while oxidizing the polyaniline in this manner is referred to as "oxidation doping" in the present specification. According to the invention, the reduced and dedoped polyaniline is doped very promptly by performing such oxidation doping, whereby an electrically conductive polyaniline composition having the novolac resin as a dopant is readily obtained.

According to the invention, the phenolsulfonic acid novolac resin and the naphtholsulfonic acid novolac resin used in the oxidation doping of the reduced and dedoped polyaniline each may be in the form of alkali metal salts, ammonium salts or organic amine salts. The alkali metal salts include, for example, sodium salt and potassium salt, and the organic amine salts include triethylamine salt, ethanolamine salt or ethylenediamine salt, however, they are not limited thereto.

In such oxidation doping, it is thought that the polyaniline is oxidized and then one of unshared electron pairs on a nitrogen atom thereof is taken away so as to cause a positive charge on the nitrogen atom and subsequently protonic acid anion existing in the reaction system approaches this positive charge so as to cancel out the above-mentioned positive charge and thus retain charge neutrality, whereby the above-mentioned nitrogen atom of polyaniline is made into a cationic radical. In this manner, polyaniline has the same semi-quinone cationic radical structure as described above to have electrical conductivity.

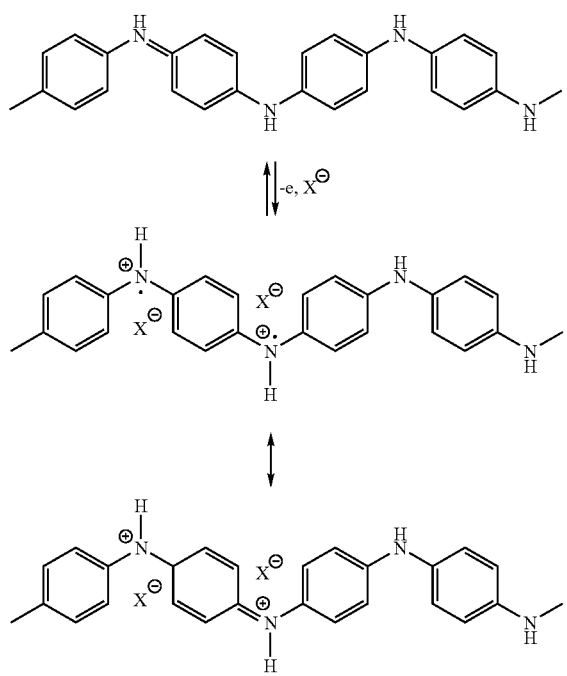

Oxidizing agents used for the oxidation doping are not particularly limited if capable of oxidizing the reduced and dedoped polyaniline; for example, including ferric salts such as ferric chloride, ferric perchlorate or ferric oxalate, cupric salts such as cupric chloride or cupric perchlorate, cuprous chloride (air oxidation catalyst), persulfates such as ammonium persulfate, dichromates such as potassium dichromate, permanganates such as potassium permanganate, iodates such as sodium iodate, chlorates such as sodium chlorate, hydrogen peroxide, manganese dioxide, ammonium cerium nitrate, lead oxide, quinone-based oxidizing agents, and the like. Specific examples of the quinone-based oxidizing agents include p-benzoquinone, o-benzoquinone, p-toluquinone, 1,2-naphthoquinone, 1,4-naphthoquinone, diphenoquinone, chloranil, 2,3-dichloro-5,6-dicyano-p-benzoquinone, tetracyanoquinodimethane, sodium 1,2-naphthoquinone-4-sulfonate, sodium 1,4-naphthoquinone-2-sulfonate, tetrafluoro-p-benzoquinone, and the like.

On the occasion of oxidation doping of reduced and dedoped polyaniline, it is not necessary to oxidize the total imino-p-phenylene structural units of polyaniline; therefore, the amount of the oxidizing agent used is not particularly limited, however, the oxidizing agent is usually used in the range of 1/10 of equivalent weight to a large excess with respect to the imino-p-phenylene structural units of polyaniline. The oxidizing agent is usually used as a solution having a concentration of 0.1 to 30% by weight, preferably an aqueous solution. The reason therefore is that an excessively low concentration of the oxidizing agent wastefully requires a long time for oxidation doping of polyaniline, while an excessively high concentration of the oxidizing agent causes the breakage of the molecular chain of polyaniline on the occasion of oxidation doping of polyaniline so as to bring the deterioration of polyaniline such as the decrease of the molecular weight of polyaniline.

The concentration of an aqueous solution of phenolsulfonic acid novolac resin or naphtholsulfonic acid novolac resin used for doping the reduced and dedoped polyaniline is not particularly limited; usually, in the range of 2 to 50% by weight as described above.

The doping of the reduced and dedoped polyaniline may be performed at room temperature, however, the doping under heating at a temperature of 50 to 100° C. reduces the time required for the doping as compared with the doping at room temperature.

The time required for doping is determined by measuring the electric conductivity of polyaniline obtained; usually, in the range of approximately 10 minutes to 10 hours. In the case of doping by adding powder of reduced and dedoped polyaniline to an aqueous solution of phenolsulfonic acid novolac resin or naphtholsulfonic acid novolac resin, the powder is pale blue at first and rendered dark green by doping.

The reduced and the dedoped polyaniline also is soluble in organic solvents similarly to the oxidized and dedoped polyaniline; therefore, the reduced and the dedoped polyaniline is dissolved in an organic solvent, cast on a base material, and heated and dried, for example, at a temperature of 50 to 150° C. to provide a self-supporting film, and then the film is subjected to oxidation doping, thereby providing a film comprising electrically conductive polyaniline. For example, an aqueous solution containing phenolsulfonic acid novolac resin or naphtholsulfonic acid novolac resin with an oxidizing agent is prepared as a doping treatment solution, and then the polyaniline film is immersed in the doping treatment solution, or the doping treatment solution is applied on the film, and then the film is washed with a solvent if necessary, thereby providing an electrically conductive polyaniline film of the invention.

When the oxidation doping is performed for a film comprising the reduced and dedoped polyaniline in this manner, the color of the film is pale blue at first, and it changes to dark blue after doping. In accordance therewith, the electric conductivity of the film is approximately $10^{-10}$ S/cm before doping and then as high as $10^0$ to $10^2$ S/cm after doping.

An electrically conductive polyaniline composition thus obtained contains sulfonic ions derived from phenolsulfonic acid novolac resin or naphtholsulfonic acid novolac resin as a dopant in an amount usually of 15 to 75% of the number of moles of aniline units in polyaniline. According to the invention, in an electrically conductive polyaniline composition, 15 to 75% of the total nitrogen atoms in the polyaniline are converted into cationic radicals, to which nitrogen atoms an equal number of anions (sulfonic ions) derived from the dopant have ionic bonds. When 50 mol % of aniline units in a polymer are thus doped, the electric conductivity of polyaniline is rendered the highest.

The electrically conductive polyaniline composition and a film thereof according to the invention exhibit a remarkably high water resistance. An electrically conductive polyaniline composition comprising polyaniline doped with polyvinylsulfonic acid has been conventionally known for having a comparatively high water resistance; nevertheless, when it is immersed in distilled water for 500 hours, the electric conductivity thereof reduces to approximately 1/400 of the initial value. On the contrary, with regard to an electrically conductive polyaniline composition comprising polyaniline doped with phenolsulfonic acid novolac resin or naphtholsulfonic acid novolac resin in accordance with the invention, the decrease of the electric conductivity thereof is within 1/10 of the initial value even if immersed in distilled water for 500 hours.

The reason why the electrically conductive polyaniline composition and a film thereof of the invention have such a high water resistance is not necessarily evident, and the invention has no restrictions by theory; it is thought that the reason is that phenolic hydroxyl groups in the phenolsulfonic acid novolac resin or the naphtholsulfonic acid novolac resin intensify the interaction with polyaniline to resultingly control the desorption of the novolac resin as a dopant from polyaniline, namely, dedoping.

In addition, the electrically conductive polyaniline composition and a film thereof of the invention are superior in heat resistance and have approximately equal heat resistance to an electrically conductive polyaniline composition having polyvinylsulfonic acid as a dopant and a film thereof, which have been conventionally known for having a comparatively high heat resistance.

INDUSTRIAL APPLICABILITY

As described above, the electrically conductive polyaniline composition obtained by doping polyaniline with phenolsulfonic acid novolac resin or naphtholsulfonic acid novolac resin and a film thereof in accordance with the invention have superior water resistance and heat resistance, and can be appropriately used as electrically conductive polymeric materials in various fields. In particular, an electrically conductive polyaniline composition according to the invention can be appropriately used, for example, as cathode materials in an aluminum electrolytic capacitor and a tantalum electrolytic capacitor, and additionally can be appropriately used as materials having water resistance and heat resistance in various uses such as antistatic materials, electrodes for organic electroluminescence, electromagnetic shielding materials and anti-corrosive materials.

EXAMPLES

The invention is described below by referring to examples together with reference examples, but the invention is not limited thereto.

Reference Example 1

The Production of an Electrically Conductive Polyaniline Composition by Oxidation Polymerization of Aniline 6000 g of distilled water, 360 mL of 36%-hydrochloric acid and 400 g (4.295 mol) of aniline were charged in this order into a 10 L-capacity separable flask provided with a stirring apparatus, a thermometer and a straight tube adapter and the aniline was dissolved in the aqueous solution of hydrochloric acid. 434 g (4.295 mol) of 97%-concentrated sulfuric acid was added to and mixed with 1493 g of distilled water in a beaker while cooled by iced water to prepare an aqueous solution of sulfuric acid. The aqueous solution of sulfuric acid was added to the above-mentioned separable flask and the total flask was cooled to a temperature of −4° C. in a low-temperature controlled bath. Then, 980 g (4.295 mol) of ammonium peroxodisulfate was added to and dissolved in 2293 g of distilled water in a beaker to prepare an aqueous solution of an oxidizing agent.

While stirring and retaining the temperature of the acidic aqueous solution of aniline salt at −3° C. or less by cooling the total flask in the low-temperature controlled bath, the aqueous solution of ammonium peroxodisulfate was gradually dropped thereto from the straight tube adapter at a rate of 1 mL/minute or less by using a tubing pump. The solution was at first colorless and transparent, and then it changed in color from greenish blue to dark green as the polymerization progresses, and subsequently powder in dark green was deposited.

A rise in temperature was observed in the reaction mixture during the deposition of powder, and also in this case, it is important to control the temperature in a reaction system at 0° C. or less, preferably −3° C. or less in order to obtain high-molecular weight polyaniline in accordance with the invention. The dropping rate of the aqueous solution of ammonium peroxodisulfate may be rendered somewhat higher, such as 8 mL/minute, after the deposition of powder, also in which case, however, it is required to adjust the dropping rate so as to retain the temperature at −3° C. or less while monitoring the temperature of the reaction mixture. Thus, after finishing the dropping of the aqueous solution of ammonium peroxodisulfate in 7 hours, the stirring was further continued at a temperature of −3° C. or less for 1 hour.

The obtained powder was collected by filtration, washed with water and acetone, and vacuum-dried at room temperature to provide 430 g of powder of an electrically conductive polyaniline composition in dark green. The powder was pressure-molded into a disk having a diameter of 13 mm and a thickness of 700 μm. The disk was found to have an electric conductivity of 14 S/cm measured by Van der Pauw method.

(The Production of Oxidized and Dedoped Polyaniline Soluble in Organic Solvents by Dedoping the Electrically Conductive Polyaniline Composition)

350 g of powder of the above-mentioned doped and electrically conductive polyaniline composition was added to 4 L of 2N-ammonia water and stirred at a rate of 5000 rpm by an autohomomixer for 5 hours. The mixture changed in color from dark green to bluish purple.

The powder was collected by filtration with a Buchner funnel and repeatedly washed with distilled water while stirred in a beaker until the filtrate became neutral, and subsequently washed with acetone until the filtrate became colorless. Thereafter, the powder was vacuum-dried at room temperature for 10 hours to provide 280 g of powder of oxidized and dedoped polyaniline in dark brown.

The oxidized and dedoped polyaniline thus obtained was soluble in N-methyl-2-pyrrolidone and the solubility thereof was 8 g (7.4%) in 100 g of the solvent. The intrinsic viscosity [η] measured at a temperature of 30° C. using N-methyl-2-pyrrolidone as a solvent was 1.23 dL/g. This polyaniline had a solubility of 1% or less in dimethyl sulfoxide and in dimethylformamide, and was substantially insoluble in any of tetrahydrofuran, pyridine, 80%-aqueous solution of acetic acid, 60%-aqueous solution of formic acid and acetonitrile.

Further, the oxidized and dedoped polyaniline was found to have a number-average molecular weight of 23000 and a weight-average molecular weight of 160000 (both were calculated in terms of polystyrene) as a result of GPC measurement by using a GPC column for N-methyl-2-pyrrolidone.

Reference Example 2

(The Production of Reduced and Dedoped Polyaniline)

2.5 g of powder of the oxidized and dedoped polyaniline obtained in Reference Example 1 was added to 97.5 g of N-methyl-2-pyrrolidone and dissolved therein while stirred, and 0.82 g of phenylhydrazine was gradually added to this solution. Then, the solution changed in color from deep blue to light dark brown, and concurrently the generation of nitrogen gas was confirmed.

After the reaction, the reaction mixture was dropped into 1.5 L of acetone substituted with nitrogen to provide precipitate in light gray. The precipitate was collected by filtration with a glass filter and washed with acetone substituted with nitrogen several times and thereafter dried under reduced pressure at room temperature to provide 2.3 g of reduced and dedoped aniline comprising an imino-p-phenylene structural unit as powder in light gray. The polyaniline thus obtained was found to have an intrinsic viscosity [η] of 1.1 dL/g measured in N-methyl-2-pyrrolidone at a temperature of 30° C.

Example 1

10 g of powder of the oxidized and dedoped polyaniline obtained in Reference Example 1 was dissolved in 90 g of N-methyl-2-pyrrolidone to prepare a 10% by weight-solution. Four sheets of pressure-sensitive adhesive tapes having a thickness of 120 μm were stuck in piles on both ends of an A4-size glass plate so as to form a bank, and the solution of polyaniline in N-methyl-2-pyrrolidone was cast thereon, drawn through a glass rod and thereafter dried at a temperature of 80° C. for 1 hour in a hot-air circulating type drier. The polyaniline film thus obtained was peeled off the glass plate. The thickness of the polyaniline film thus obtained was 42 μm. Three sheets of 1 cm-square films were cut out of this film.

An aqueous solution of p-phenolsulfonic acid novolac resin (available from Konishi Chemical Industry Co., Ltd., and having a weight-average molecular weight of 20000 calculated in terms of sodium polystyrene sulfonate as a result of GPC measurement) was prepared at a solids concentration of 20% by weight and 30 g of the solution was placed in a glass sample tube of 50-mL capacity. The glass sample tube was then immersed in a 80° C.-temperature controlled bath. After immersion for 30 minutes, three sheets of the above-mentioned polyaniline films were immersed in the aqueous solution of phenolsulfonic acid novolac resin in the sample tube for 1 hour so that they were doped.

After the doping treatment, the polyaniline films were taken out and each washed with 30 mL of methanol three times to remove the novolac resin adhering to the surfaces of the films, and then dried in a drier at a temperature of 80° C. for 30 minutes, thereby providing three sheets of films comprising an electrically conductive polyaniline composition having p-phenolsulfonic acid novolac resin as a dopant. These three sheets of films were found to have electric conductivities of 8.8 S/cm, 9.5 S/cm and 10.35 S/cm, respectively, measured by Van der Pauw method.

Among these three sheets of films, the one having an electric conductivity of 10.35 S/cm was subjected to elemental analysis by flask combustion method/ion chromatograph to measure the content of sulfur and doping efficiency was calculated based thereon to show that the doping efficiency of polyaniline was 30%. That is, it was confirmed that 30% of aniline units of polyaniline (namely, nitrogen atoms in polyaniline) were doped with sulfonic ions of p-phenolsulfonic acid novolac resin.

Further, among the above-mentioned three sheets of films, the one having an electric conductivity of 8.8 S/cm was immersed in 15 mL of distilled water in a glass sample tube of 20-mL capacity and then taken out with time so as to measure the electric conductivity thereof. The results are shown in FIG. 1. As clarified in FIG. 1, it is denoted that the electrically conductive polyaniline film of the invention has an electric conductivity of 1.3 S/cm even after being immersed in distilled water for 578 hours. Accordingly, it has a high water resistance as the decrease of the electric conductivity after the immersion in distilled water is within 1/10 of the initial electric conductivity.

Figure 2:
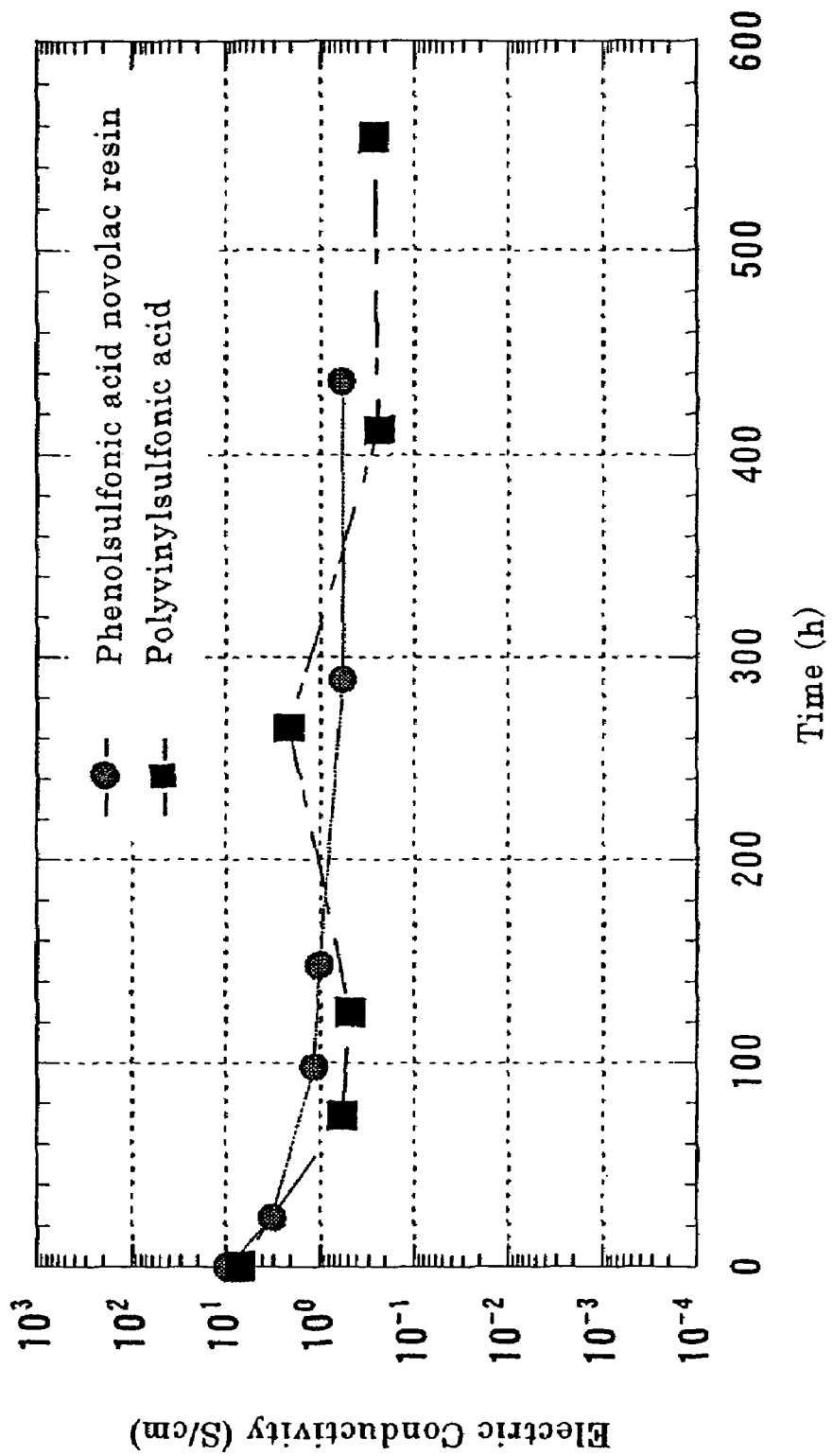
FIG. 2 is a graph showing the variations with time of electric conductivity of a film of electrically conductive polyaniline comprising polyaniline doped with p-phenolsulfonic acid novolac resin in accordance with the invention when it is placed under an atmosphere of 125° C. while being compared with that of a film of electrically conductive polyaniline comprising polyaniline doped with polyvinylsulfonic acid.

The film having an electric conductivity of 9.5 S/cm was stuck crosswise on a 10 cm-square glass plate with a 2-mm-wide pressure-sensitive adhesive tape made of polytetrafluorethylene resin, placed in a hot-air circulating type drier at a temperature of 125° C. and then taken out with time so as to measure the electric conductivity thereof. The results are shown in FIG. 2. As clarified in FIG. 2, it is denoted that the electrically conductive polyaniline film of the invention has a superior heat resistance.

Comparative Example 1

An aqueous solution of sodium polyvinylsulfonate available from Aldrich Corporation was ion-exchanged by strongly acidic cation-exchange resin Dowex W-50×12 (available from The Dow Chemical Company) to prepare a 20% by weight-aqueous solution of free acid type polyvinylsulfonic acid.

The same manner as Example 1 was performed except for using the polyvinylsulfonic acid as mentioned above as a dopant to provide two sheets of electrically conductive polyaniline films having the polyvinylsulfonic acid as a dopant, whose electric conductivities were 3.7 S/cm and 7.1 S/cm, respectively.

Among these two sheets of films, the one having an electric conductivity of 3.7 S/cm was subjected to water resistance test in the same manner as Example 1. As the results are shown in FIG. 2, the film was found to have an electric conductivity of $9.2 \times 10^{-3}$ S/cm, that is, 1/400 of the initial electric conductivity when immersed in distilled water for 554 hours. Also, heat resistance test was performed for the film having an electric conductivity of 7.1 S/cm in the same manner as Example 1. The results are shown in FIG. 2.

Example 2

An aqueous solution of phenolsulfonic acid novolac resin (available from Konishi Chemical Industry Co., Ltd., and having a weight-average molecular weight of 20000 calculated in terms of sodium polystyrene sulfonate as a result of GPC measurement) was prepared at a solids concentration of 20% by weight and 180 mL of the solution was placed in a 300 mL-capacity separable flask provided with a stirring apparatus, a thermometer and a straight tube adapter. 12.0 g of aniline was further added to and dissolved in the solution while stirred, and the total separable flask was cooled to a temperature of −5° C. by using a low-temperature controlled bath.

Then, 28.4 g of ammonium peroxodisulfate was dissolved in 66.3 g of ion-exchange water to prepare a colorless and transparent aqueous solution. The aqueous solution of ammonium peroxodisulfate was gradually dropped from the straight tube adapter to the aqueous solution of aniline containing the phenolsulfonic acid novolac resin while stirred at a rate of 1 mL/minute or less by using a tubing pump.

The solution was at first colorless and transparent and then changed from greenish blue to dark green during the dropping of the aqueous solution of ammonium peroxodisulfate as the polymerization of aniline progresses, and subsequently powder in dark green was deposited. As a rise in temperature due to heat of reaction was observed in the reaction mixture during this deposition of powder, the temperature of the reaction mixture was controlled at −3° C. or less. Thus, after finishing the dropping of the aqueous solution of ammonium peroxodisulfate in 45 minutes, the stirring was further continued for 30 minutes while retaining the temperature of the reaction mixture at −3° C. or less.

The obtained powder of polyaniline was collected by filtration, washed with water and acetone, and then vacuum-dried at room temperature to provide 16.3 g of powder of an electrically conductive polyaniline composition in dark green having phenolsulfonic acid novolac resin as a dopant. The powder was molded into a disk having a diameter of 13 mm and a thickness of 740 μm. The disk was found to have an electric conductivity of 9.3 S/cm as a result of measurement by Van der Pauw method.

1 g of the powder of the electrically conductive polyaniline composition was added to distilled water and was stood at room temperature for 2 weeks, and then was collected by filtration, washed with acetone and vacuum-dried at room temperature. The powder was molded into a disk having a diameter of 13 mm and a thickness of 765 μm in the same manner as above. The disk was found to have an electric conductivity of 7.6 S/cm by measurement by Van der Pauw method. Accordingly, it is denoted that the electrically conductive polyaniline composition of the invention has a high water resistance as the decrease of the electric conductivity due to the immersion in distilled water for 2 weeks is very slight.

Comparative Example 2

The same manner as Example 2 was performed except for replacing phenolsulfonic acid novolac resin with methansulfonic acid in Example 2 to provide powder of an electrically conductive polyaniline composition in dark green having methansulfonic acid as a dopant. The electric conductivity of this electrically conductive polyaniline composition was 18.7 S/cm.

In the same manner as Example 2, the powder of the electrically conductive polyaniline composition was immersed in distilled water in 2 weeks and taken out thereof. The electric conductivity of the electrically conductive polyaniline composition was then measured and was found to be $2.2 \times 10^{-5}$ S/cm. Thus, it is denoted that the electric conductivity was remarkably reduced after the immersion in distilled water for 2 weeks.

Example 3

The same manner as Example 1 was performed except for replacing an aqueous solution of p-phenolsulfonic acid novolac resin with an aqueous solution of 1-naphthol-4-sulfonic acid novolac resin (available from Konishi Chemical Industry Co., Ltd., and having a weight-average molecular weight of 30000 calculated in terms of polystyrene sodium sulfonate as a result of GPC measurement) in Example 1 to provide three sheets of films comprising an electrically conductive polyaniline composition having 1-naphthol-4-sulfonic acid novolac resin as a dopant. These three sheets of films were fount to have electric conductivities of 5.5 S/cm, 3.4 S/cm and 6.3 S/cm, respectively, as a result of measurement by Van der Pauw method Among the three sheets of films, the ones having electric conductivities of 5.5 S/cm and 3.4 S/cm, respectively, were subjected to water resistance test. That is, the two sheets of films were immersed in 15 mL of distilled water in a glass sample tube of 20-mL capacity and stood under room temperature for 535 hours, and thereafter were washed with water and dried to measure the electric conductivity. As a result, the two sheets of films were found to have electric conductivities of 3.1 S/cm and 1.8 S/cm, respectively. Thus, little change was observed as compared with the values before being immersed in distilled water.

The film having an electric conductivity of 6.3 S/cm was subjected to heat resistance test. That is, it was stuck crosswise on a 10 cm-square glass plate with a 2 mm-wide pressure-sensitive adhesive tape made of polytetrafluoroethylene resin, placed in a hot-air circulating type drier at a temperature of 125° C. After 512 hours, the film was taken out of the dryer and was found to have an electric conductivity of 1.3 S/cm; therefore it is denoted to have a superior heat resistance.

Example 4

10 g of powder of the reduced and dedoped polyaniline obtained in Reference Example 2 was dissolved in 90 g of N-methyl-2-pyrrolidone to prepare a 10% by weight-solution. Four sheets of pressure-sensitive adhesive tapes made of polytetrafluoroethylene resin having a thickness of 120 μm were stuck in piles on both ends of an A4-size glass plate so as to form a bank, and the solution of polyaniline in N-methyl-2-pyrrolidone was cast thereon, drawn through a glass rod and thereafter put into a hot-air circulating type drier and dried at a temperature of 80° C. for 1 hour. The polyaniline film thus obtained was peeled off the glass plate. The thickness of the polyaniline film thus obtained was 38 μm. Four sheets of 1 cm-square films were cut out of this film.

An aqueous solution of p-phenolsulfonic acid novolac resin (available from Konishi Chemical Industry Co., Ltd., and having a weight-average molecular weight of 20000 calculated in terms of sodium polystyrene sulfonate as a result of GPC measurement) was concentrated with an evaporator until a syrup was obtained. Ethanol was added to the syrup to prepare a solution having a solids concentration of 20% by weight. p-Benzoquinone was added to and dissolve in the solution to prepare a solution of 2.5% by weight in terms of benzoquinone, thereby providing a treatment solution for oxidation doping.

30 g of the treatment solution for doping was put into a glass sample tube of 50-mL capacity, and the above-mentioned four sheets of films of the reduced and dedoped polyaniline were immersed in the solution and stood at room temperature. Every two sheets of the polyaniline films were taken out thereof in 30 minutes and 1 hour, respectively, and washed with 30 mL of methanol three times for removing phenolsulfonic acid novolac resin and p-benzoquinone as the oxidizing agent adhering to the surfaces of the films, followed by drying in a drier at a temperature of 80° C. for 30 minutes.

The electric conductivity of each of the films thus obtained was measured by Van der Pauw method. The electric conductivities of two sheets of polyaniline films A and B doped for 30 minutes were 4.2 S/cm and 5.3 S/cm, respectively, while the electric conductivities of two sheets of polyaniline films C and D doped for 1 hour were 8.9 S/cm and 10.1 S/cm, respectively. Then, the films A and C were as were subjected to water resistance test. That is, they were immersed in 15 mL of distilled water in a glass sample tube of 20-mL capacity for 542 hours and then taken out thereof so as to measure the electric conductivities thereof. The electric conductivity of the film A that had been doped for 30 minutes was 2.1 S/cm, while the electric conductivity of the film C that had been doped for 1 hour was 8.2 S/cm.

The films B and D were subjected to heat resistance test. The films were stuck crosswise on a 10 cm-square glass plate with a 2-mm-wide pressure-sensitive adhesive tape made of polytetrafluorethylene resin, put into a hot-air circulating type drier at a temperature of 125° C. over 542 hours and thereafter taken out so as to measure the electric conductivities thereof. The electric conductivity of the film B that had been doped for 30 minutes was 1.1 S/cm, while the electric conductivity of the film D that had been doped for 1 hour was 5.8 S/cm.

After the water resistance test and the heat resistance test, any of the films were found to have electric conductivities that had little change as compared with the initial electric conductivities. Therefore, it is denoted that the electrically conductive polyaniline film of the invention has high water resistance and heat resistance.

Comparative Example 3

An aqueous solution of sodium polyvinylsulfonate available from Aldrich Corporation was ion-exchanged by strongly acidic cation-exchange resin Dowex W-50X12 (available from The Dow Chemical Company to prepare a 20% by weight-aqueous solution of free acid type polyvinylsulfonic acid.

The same manner as Example 4 was performed except for using this aqueous solution of polyvinylsulfonic acid as a dopant solution to prepare four sheets of electrically conductive polyaniline films having the polyvinylsulfonic acid as a dopant. The electric conductivities of two sheets of polyaniline films A and B doped for 30 minutes were 18.8 S/cm and 15.3 S/cm, respectively, while the electric conductivities of two sheets of polyaniline films C and D doped for 1 hour were 26.7 S/cm and 30.3 S/cm, respectively.

The films A and C were subjected to water resistance test. That is, they were immersed in 15 mL of distilled water in a glass sample tube of 20-mL capacity for 542 hours and thereafter taken out so as to measure the electric conductivities thereof. The electric conductivity of the film A that had been doped for 30 minutes was $4.4 \times 10^{-2}$ S/cm, while the electric conductivity of the film C that had been doped for 1 hour was $7.1 \times 10^{-2}$ S/cm. Accordingly, the electric conductivities of the films after the water resistance test were approximately 1/400 of the initial electric conductivities.

In turn, the films B and D were subjected to heat resistance test. That is, they were stuck crosswise on a 10 cm-square glass plate with a 2-mm-wide pressure-sensitive adhesive tape made of polytetrafluorethylene resin, put into a hot-air circulating type drier at a temperature of 125° C. over 542 hours and thereafter taken out so as to measure the electric conductivities thereof. The electric conductivity of the film B that had been doped for 30 minutes was 1.2 S/cm, while the electric conductivity of the film D that had been doped for 1 hour was 3.3 S/cm. Accordingly, the electric conductivities of the films after the heat resistance test were approximately 1/10 of the initial electric conductivities.

Example 5

The same manner as Example 4 was performed except for replacing an aqueous solution of phenolsulfonic acid novolac resin with an aqueous solution of 1-naphthol-4-sulfonic acid novolac resin (available from Konishi Chemical Industry Co., Ltd., and having a weight-average molecular weight of 30000 calculated in terms of sodium polystyrene sulfonate as a result of GPC measurement) and replacing p-benzoquinone as the oxidizing agent with 2,3-dichloro-5,6-dicyano-p-benzoquinone in Example 4 so as to obtain four sheets of electrically conductive polyaniline films having 1-naphthol-4-sulfonic acid novolac resin as a dopant. The electric conductivities of these electrically conductive polyaniline films were measured by Van der Pauw method. The electric conductivities of two sheets of polyaniline films A and B doped for 30 minutes were 1.2 S/cm and 2.2 S/cm respectively, while the electric conductivities of two sheets of polyaniline films C and D doped for 1 hour were 3.4 S/cm and 4.1 S/cm respectively.

Then, the films A and C were subjected to water resistance test. They were immersed in 15 mL of distilled water in a glass sample tube of 20-mL capacity for 508 hours and thereafter taken out so as to measure the electric conductivities thereof. The electric conductivity of the film A that had been doped for 30 minutes was 0.78 S/cm, while the electric conductivity of the film C that had been doped for 1 hour was 2.1 S/cm.

The films B and D were subjected to heat resistance test. They were stuck crosswise on a 10 cm-square glass plate with a 2-mm-wide pressure-sensitive adhesive tape made of polytetrafluorethylene resin, put into a hot-air circulating type drier at a temperature of 125° C. and then taken out in 508 hours so as to measure the electric conductivities thereof. The electric conductivity of the film B that had been doped for 30 minutes was 0.54 S/cm, while the electric conductivity of the film D that had been doped for 1 hour was 2.8 S/cm.

Thus, it is denoted that the electrically conductive polyaniline film of the invention has high water resistance and heat resistance as the electric conductivity thereof after both the water resistance test and the heat resistance test had little change as compared with the initial value.

The invention claimed is:

1. An electrically conductive polyaniline composition comprising polyaniline doped with naphtholsulfonic acid novolac resins.

2. An electrically conductive polyaniline composition according to claim 1, wherein the polyaniline comprises a repeating unit represented by the general formula (I)

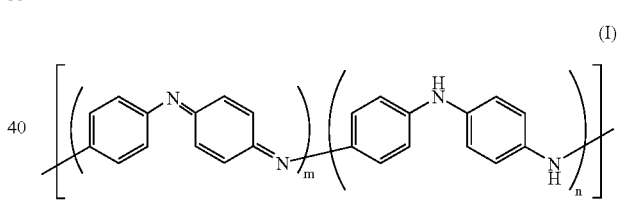

(I)

wherein m and n denote molar fractions of a quinonediimine structural unit and a phenylenediamine structural unit, respectively, in the repeating unit, and satisfy the conditions: $0 \leq m \leq 1$, $0 \leq n \leq 1$ and $m+n=1$.

3. An electrically conductive polyaniline composition according to claim 1, wherein the naphtholsulfonic acid novolac resin is represented by the general formula (IV)

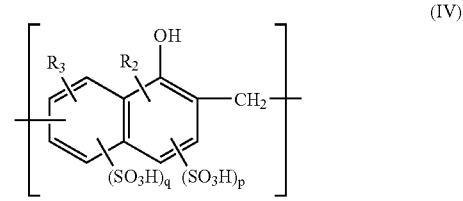

(IV)

wherein $R_2$ and $R_3$ denote each independently a hydrogen atom, an alkyl group, an alkoxyl group, a hydroxyl group, a carboxyl group or an amino group, and p and q denote each independently an integer of 0, 1 or 2, provided that p and q are not simultaneously 0.

4. An electrically conductive film comprising an electrically conductive polyaniline composition according to claim 1.

5. A method of producing an electrically conductive polyaniline composition comprising contacting polyaniline with naphtholsulfonic acid novolac resins to dope the polyaniline with the novolac resin.

6. A method of producing an electrically conductive polyaniline composition according to claim 5, wherein the polyaniline comprises a repeating unit represented by the general formula (I)

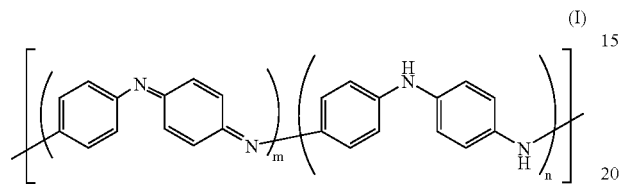

(I)

wherein m and n denote molar fractions of a quinonediimine structural unit and a phenylenediamine structural unit respectively in the repeating unit, and satisfy the conditions: $0 \leq m \leq 1$, $0 \leq n \leq 1$ and $m+n=1$.

7. A method of producing an electrically conductive polyaniline composition according to claim 5, wherein the naphtholsulfonic acid novolac resin is represented by the general formula (IV)

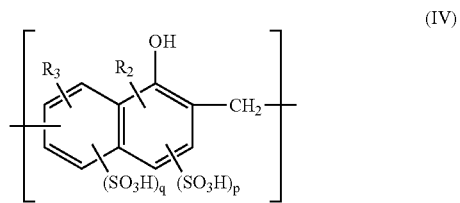

(IV)

wherein $R_2$ and $R_3$ denote each independently a hydrogen atom, an alkyl group, an alkoxyl group, a hydroxyl group, a carboxyl group or an amino group, and p and q denote each independently an integer of 0, 1 or 2, provided that p and q are not simultaneously 0.

* * * * *